United States Patent [19]

Matsumura et al.

[11] Patent Number: 5,478,546
[45] Date of Patent: Dec. 26, 1995

[54] PROCESS FOR PREPARING POWDER OF SILICON COMPOUND

[75] Inventors: Kazuyuki Matsumura; Masaaki Yamaya, both of Takasaki, Japan

[73] Assignee: Shin-Etsu Chemical Co., Ltd., Tokyo, Japan

[21] Appl. No.: 209,068

[22] Filed: Mar. 11, 1994

[30] Foreign Application Priority Data

Mar. 12, 1993 [JP] Japan .................................. 5-078863
Mar. 12, 1993 [JP] Japan .................................. 5-078864

[51] Int. Cl.$^6$ .............................. C01B 33/12; C07F 7/04
[52] U.S. Cl. ........................ 423/335; 556/453; 556/455; 556/456; 556/457; 556/458
[58] Field of Search .................................. 423/335, 336; 556/456, 455, 458, 457, 453, 452

[56] References Cited

U.S. PATENT DOCUMENTS 4,765,818  8/1988  Che et al. ............................. 423/338
5,063,003  11/1991  Gonzalez-Oliver ................. 423/335
5,086,145  2/1992  Morimoto et al. ................... 556/462

FOREIGN PATENT DOCUMENTS 62-166887  7/1987  Japan .

*Primary Examiner*—Gary P. Straub
*Assistant Examiner*—Stuart L. Hendrickson
*Attorney, Agent, or Firm*—Oblon, Spivak, McClelland, Maier & Neustadt

[57] ABSTRACT

An alkoxysilane is brought into a hydrolysis-polycondensation reaction using a fluoride salt, e.g. NaF, or a fluorine-containing silicon compound having an Si—F bond in its molecule, e.g. FSi(OCH$_3$)$_3$, as a catalyst, to produce a powder of a silicon compound such as silica. The process reduces markedly the period of time required for the hydrolysis-polycondensation reaction and yields a porous silicon compound powder with low bulk specific gravity. The catalyst is excellent in handleability and safety.

10 Claims, No Drawings

PROCESS FOR PREPARING POWDER OF SILICON COMPOUND

BACKGROUND OF THE INVENTION

1. Field of the Invention

The present invention relates to a process for preparing a powder of a silicon compound such as silica, organopolysiloxane and the like.

2. Description of the Prior Art

Metal alkoxides, in general, are susceptible to rapid hydrolysis-polycondensation reaction upon contact with water, to form polymers or particulate substances. However, alkoxysilanes are hydrolyzed exceptionally slowly and are therefore used suitably as a material for preparing ceramics, glasses and the like by the so-called "sol-gel processing" (Refer to Sumio Sakka, *Science of Sol-Gel Processing*, Agne Shofusha, 1988). Also, the slow hydrolysis of alkoxysilanes makes it possible to obtain condensation products in various forms such as bulk, thin film, fiber, etc.

The hydrolysis-polycondensation reaction in the "sol-gel processing" is conducted by mixing an alcoholic solution of an alkoxysilane with water, in the presence of an acid catalyst such as hydrochloric acid, sulfuric acid and the like. Although this process is highly suited to preparation of ceramics, glasses and the like, it has difficulties in that an ultrafine porous powder of a silicon compound cannot be obtained. That is, the low hydrolysis rate of alkoxysilane causes gradual formation of particles of the reaction product, so that the particles obtained have large size and a close-packed structure, which leads to a high bulk specific gravity.

As a means for obtaining an ultrafine porous powder of a silicon compound, an increase in the rate of hydrolysis of an alkoxysilane may be contemplated. That is, if the hydrolysis-polycondensation reaction can be effected in a shorter time, the condensation is completed while water and a solvent such as alcohol remain contained in the reaction product, possibly resulting in the formation of an ultrafine porous powder of a silicon compound. Previously, the present inventors have found that where hydrofluoric acid is used as a catalyst, the hydrolysis-polycondensation reaction of an alkoxysilane can proceed very rapidly, to give a favorable powder of a silicon compound. Refer to Japanese Pre-examination Patent Publication (KOKKAI) No. 62-166887 (1987)).

However, although hydrofluoric acid is a very effective acid catalyst, its toxicity and dangerousness will lead to problems as to handleability and safety when its application is considered in connection with mass-production on an industrial basis.

Other acid catalysts such as hydrochloric acid, sulfuric acid, trifluoromethanesulfonic acid and the like can shorten to some extent the hydrolysis-polycondensation reaction time if they are used in increased amounts. However, the reduction of reaction time by use of such catalysts is not sufficient for obtaining an ultrafine porous powder of a silicon compound. Besides, it is very difficult to remove large amounts of the acid catalysts after the reaction. Furthermore, these catalysts are not satisfactorily high in handleability and safety.

SUMMARY OF THE INVENTION

Accordingly it is an object of the present invention to provide a process for preparing an ultrafine porous powder of a silicon compound speedily and with good handleability and safety.

The present invention provides a process for preparing a powder of a silicon compound, which comprises subjecting an alkoxysilane to a hydrolysis-polycondensation reaction in the presence of at least one compound selected from the group consisting of fluorides and fluorine-containing silicon compounds having at least one Si—F bond in the molecule thereof.

That is, a characteristic feature of the process of the present invention is to use the above-mentioned fluoride or fluorine-containing silicon compound as a reaction catalyst. These compounds exhibits a catalytic activity comparable to that of the above-described hydrofluoric acid, whereby the hydrolysis-polycondensation reaction of the alkoxysilane is rapidly completed. Therefore, it is possible to obtain an ultrafine porous powder of a silicon compound. Furthermore, the compounds for use as a catalyst in the process of the present invention are less dangerous and, hence, superior in handleability and safety, as compared to the conventional catalysts such as hydrofluoric acid, hydrochloric acid or sulfuric acid.

DETAILED DESCRIPTION OF PREFERRED EMBODIMENTS

Alkoxysilane

In the present invention, the alkoxysilane used as a starting material for reaction is a silane compound having at least one alkoxyl group (which is a hydrolyzable group) in its molecule. The alkoxysilane includes, for example, the compounds having the following general formula (1):

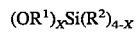

$$(OR^1)_x Si(R^2)_{4-x}$$

wherein X is an integer of 1 to 4, and $R^1$ and $R^2$ are each independently an unsubstituted or substituted monovalent hydrocarbon group. In the formula (1), the monovalent hydrocarbon groups $R^1$ and $R^2$ include, for example, alkyl groups such as methyl, ethyl, propyl, butyl, pentyl, hexyl, heptyl, octyl and the like; cycloalkyl groups such as cyclohexyl and the like; aryl groups such as phenyl and the like; and aralkyl groups such as benzyl, phenylethyl and the like. In each of the groups mentioned, a part or all of hydrogen atoms may be substituted with halogen. Among the groups $R^1$ and $R^2$, normally preferred are alkyl groups having not more than 4 carbon groups and the phenyl group.

Of the alkoxysilanes for use in the process of the present invention, typical examples include the followings (in the formulas below, Ph stands for the phenyl group):

alkoxysilanes having three or four alkoxyl groups (X):

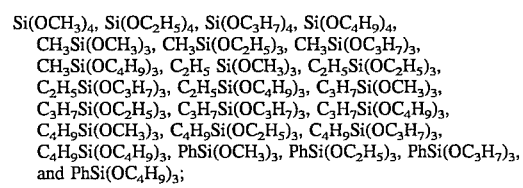

alkoxysilanes having two alkoxyl groups (X):

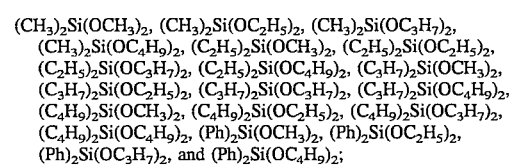

alkoxysilanes having one alkoxyl group (X):

(CH₃)₃SiOCH₃, (CH₃)₃SiOC₂H₅, (CH₃)₃SiOC₃H₇, (CH₃)₃SiOC₄H₉, (C₂H₅)₃SiOCH₃, (C₂H₅)₃SiOC₂H₅, (C₂H₅)₃SiOC₃H₇, (C₂H₅)₃SiOC₄H₉, (C₃H₇)₃SiOCH₃, (C₃H₇)₃SiOC₂H₅, (C₃H₇)₃SiOC₃H₇, (C₃H₇)₃SiOC₄H₉, (C₄H₉)₃SiOCH₃, (C₄H₉)₃SiOC₂H₅, (C₄H₉)₃SiOC₃H₇, (C₄H₉)₃SiOC₄H₉, (Ph)₃SiOCH₃, (Ph)₃SiOC₂H₅, (Ph)₃SiOC₃H₇, and (Ph)₃SiOC₄H₉

Among these, preferred are Si(OCH₃)₄, Si(OC₂H₅)₄, CH₃Si(OCH₃)₃ and CH₃Si(OC₂H₅)₃.

The above alkoxysilanes may be used either singly or in combination of two or more, provided the resulting hydrolysis-polycondensation reaction product is a solid. It is preferable to use an alkoxysilane which has 3 or 4 alkoxyl groups. Where an alkoxysilane having 1 or 2 alkoxyl groups is used in combination with an alkoxysilane having 3 or 4 alkoxyl groups, the amount of the monoalkoxysilane and/or dialkoxysilane is preferably not more than 30% by weight based on the total amount of the alkoxysilanes. If the amount of the monoalkoxysilane and/or dialkoxysilane exceeds 30% by weight, the resulting hydrolysis-polycondensation reaction product is in a liquid or oily state, and it is difficult to obtain a desired solid powdery substance.

Catalyst

The catalyst used for accelerating the hydrolysis-polycondensation reaction of the alkoxysilane is a fluoride or a silicon compound which contains at least one Si—F bond in its molecule.

The fluoride includes, for example, fluorides of an Group I element such as LiF, NaF, KF, RbF, CsF and the like; fluorides of a Group II element such as BeF₂, MgF₂, CaF₂, SrF₂, BaF₂ and the like; fluorides of a Group III element such as BF₃, AlF₃, GaF₃, InF₃, TlF₃ and the like; such fluorides as CuF₂, ZnF₂, SnF₂, PdF₂, SbF₃, CrF₃, YF₃ and the like; fluorides of lanthanoid such as LaF₃, CeF₃, PrF₃, NdF₃, SmF₃, EuF₃, GdF₃, TbF₃, DyF₃, HoF₃, ErF₃ and the like; quaternary ammonium salts such as (CH₃)₄N.F, (CH₃CH₂)₄N.F, (CH₃CH₂CH₂)₄N.F, (CH₃CH₂CH₂CH₂)₄N.F and the like; hydrates of these, and so forth. These fluorides may be used either singly or in combination of two or more. Among these, particularly preferred in view of cost, solubility in water, handleability and safety, are NaF, KF, (CH₃CH₂CH₂CH₂)₄N.F and the like.

As the fluorine-containing silicon compound described above, organic as well as inorganic compounds can be used, provided they have an Si—F bond in their molecule.

The organic compounds usable include, for example, the silane compounds having the following general formula (2):

$$F_pSi(OR)_{4-p} \quad (2)$$

wherein R is an alkyl group having not more than 4 carbon atoms, and p is an integer of 1 to 3, and the silane compounds having the following general formula (3):

$$F_pSiR_{4-p} \quad (3)$$

wherein R and p are as defined above.

Specifically, the organic compounds include the silane compounds as follow:

FSi(OCH₃)₃, FSi(OC₂H₅)₃, FSi(OC₃H₇)₃, FSi(OC₄H₉)₃, F₂Si(OCH₃)₂, F₂Si(OC₂H₅)₂, F₂Si(OC₃H₇)₂, F₂Si(OC₄H₉)₂, F₃SiOCH₃, F₃SiOC₂H₅, F₃SiOC₃H₇, F₃SiOC₄H₉, FSi(CH₃)₃, FSi(C₂H₅)₃, FSi(C₃H₇)₃, FSi(C₄H₉)₃, F₂Si(CH₃)₂, F₂Si(C₂H₅)₂, F₂Si(C₃H₇)₂, F₂Si(C₄H₉)₂ F₃SiCH₃, F₃SiC₂H₅, F₃SiC₃H₇, and F₃SiC₄H₉.

Besides the above silane compounds, Si—F bond containing polysiloxanes such as those represented by the formula:

$$-\!\!\left(\!\!\begin{array}{c}F\\|\\Si\!-\!O\\|\\R\end{array}\!\!\right)_{\!\!m}\!\!-$$

(wherein R is as defined above, and m is an integer of 2 to 1,000) and Si—F bond containing polysilane compounds such as those represented by the formula:

$$-\!\!\left(\!\!\begin{array}{c}F\\|\\Si\\|\\R\end{array}\!\!\right)_{\!\!m}\!\!-$$

(wherein R may be the same or different and each are H, F, Cl or an alkyl group, and m is as defined above) may also be used.

On the other hand, the inorganic compounds which can be used include:

SiF₄, H₂SiF₆, Na₂SiF₆, (NH₄)₂SiF₆ and the like.

The fluorine-containing silicon compounds may be used either singly or in combination of two or more. Among these, particularly preferred from the viewpoints of cost, solubility in water, handleability and safety, are FSi(OCH₃)₃, FSi(OC₂H₅)₃, (NH₄)₂SiF₆ and the like.

The above-described catalyst is used in an amount such that the molar ratio of the silicon atoms in the alkoxysilane to the fluorine atoms in the catalyst is in the range from 1.0:0.001 to 1.0:2.0, preferably from 1.0:0.01 to 1.0:0.1. Where the catalyst is used in an amount below the range, it cannot show an effective catalytic action. In such a case, it takes a long time to complete the hydrolysis-polycondensation reaction of the alkoxysilane, and the resulting powdery substance tends to be unsatisfactory in regard of ultrafineness, porosity or the like. On the other hand, a catalyst amount in excess of the range leads to a lower pot yield and a higher cost.

Hydrolysis-Polycondensation Reaction

The hydrolysis-polycondensation reaction of the alkoxysilane is conducted by mixing the alkoxysilane with water in the presence of the above-described catalyst. Although the reaction normally proceeds effectively at room temperature, the reaction system may be heated suitably, if desired.

In carrying out the reaction, an organic solvent such as alcohol, ether, ester, ketone or the like may be used, as required. Preferable examples of the organic solvent include: alcohol solvents such as methyl alcohol, ethyl alcohol, 1-propyl alcohol, 2-propyl alcohol and the like; ether solvents such as dimethyl ether, diethyl ether, dipropyl ether and the like; ester solvents such as methyl acetate, ethyl acetate and the like; and ketone solvents such as acetone, methyl ethyl ketone and the like. The amount of these solvents to be used is normally 500% by weight or less, preferably 150% by weight or less, based on the alkoxysilane.

The amount of water to be mixed with the alkoxysilane for hydrolysis-polycondensation reaction is preferably such that the molar ratio of the alkoxyl groups in the alkoxysilane to water is in the range from 1:0.5 to 1:50. If the amount of water used is less than the range, the amount of organic groups left unhydrolyzed is increased, so that it is difficult to obtain a porous powder. If the amount of water exceeds the range, on the other hand, pot yield is lowered, which is disadvantageous economically.

Generally, mixing of the alkoxysilane with water is carried out, for example, by (a) pouring water into an alkoxysilane solution being stirred or by (b) pouring the alkoxysilane solution into water being stirred.

The above-described catalyst such as fluorides and the like is preferably dissolved in water or an appropriate organic solvent, before being added to the reaction system. The catalyst may preliminarily be added to the alkoxysilane or to the water which is to be used for hydrolysis. Also, water and the alkoxysilane solution may be mixed with each other, followed by adding the catalyst thereto.

Furthermore, before the hydrolysis-polycondensation reaction, the alkoxysilane may preliminarily be partially hydrolyzed by using an aqueous solution of an appropriate acid catalyst or a base catalyst.

Powder

Upon the hydrolysis-polycondensation reaction described above, a silicon compound such as silica, organopolysiloxane and the like is produced. The condensation reaction product is separated from the solution by filtration or other means, and then subjected to evaporation and drying to remove therefrom water, organic solvent and the like, whereby the desired powder can be obtained. Alternatively, the reaction product may be recovered from the reaction system directly as a powder, by using a spray dryer, vacuum dryer or other similar equipment.

The powder of a silicon compound obtained as above is a porous ultrafine solid with low bulk specific gravity. Therefore, the powder is suitable for use as packing material for columns and as solid carrier for supporting a variety of enzymes, metallic compounds and the like. Thus, the powder of a silicon compound may find use in such applications as bioreactors, immobilized enzymes, fixed catalysts, carriers for recovery of metals, etc. Furthermore, the powder is also useful as a material for producing new ceramics.

EXAMPLES

The present invention will now be described in detail below, with reference to working examples of the invention and comparative examples. In the following, Examples 1 to 12 are examples in which a fluoride is used as a catalyst while Examples 13 to 22 are examples in which a fluorine-containing silicon compound is used as a catalyst.

Example 1

A 500-ml reaction vessel equipped with a stirrer, thermometer and cooler was charged with 61 g (0.4 mol) of tetramethoxysilane and 68 g (1.5 mol) of ethanol, followed by mixing by stirring.

To the mixture in the vessel, 0.23 g (0.004 mol) of KF dissolved in 30 g (1.68 mol) of water was added dropwise. After the addition was over, the resulting mixture was stirred at room temperature for 3 minutes, through which the reaction mixture turned from a colorless transparent liquid to a white gel-like matter. The gel-like matter was filtered off through a Buchner funnel, and washed with distilled water and subsequently with acetone. The reaction product thus washed was then treated at 120° C. and 15 mmHg for 2 hours in a vacuum dryer for removing the solvents therefrom, to give 24.0 g of a silica powder.

The silica powder obtained had a bulk specific gravity of 0.30 g/cm$^3$ and a specific surface area of 790 m$^2$/g.

Example 2

When a reaction was carried out in the same manner as in Example 1 except for using 0.17 g (0.004 mol) of NaF instead of KF, the reaction mixture under stirring turned to a white gel-like matter in 5 minutes after the dropwise addition of the aqueous NaF solution was finished. The gel-like matter was treated in the same manner as in Example 1, to give 23.1 g of a silica powder, which had a bulk specific gravity of 0.40 g/cm$^3$ and a specific surface area of 702 m$^2$/g.

Example 3

When a reaction was carried out in the same manner as in Example 1 except for using 0.15 g (0.004 mol) of NH$_4$F in place of KF, the reaction mixture under stirring turned to a white gel-like matter in 8 minutes after the dropwise addition of the aqueous NH$_4$F solution was over. The gel-like matter was treated in the same manner as in Example 1, to give 23.0 g of a silica powder having a bulk specific gravity of 0.41 g/cm$^3$ and a specific surface area of 690 m$^2$/g.

Example 4

When a reaction was carried out in the same manner as in Example 1 except for using 0.20 g (0.002 mol) of CuF$_2$ in place of KF, the reaction mixture under stirring turned to a white gel-like matter in 10 minutes after the dropwise addition of the aqueous CuF$_2$ solution was over. The gel-like matter was treated in the same manner as in Example 1, to give 23.0 g of a silica powder having a bulk specific gravity of 0.39 g/cm$^3$ and a specific surface area of 715 m$^2$/g.

Example 5

When a reaction was carried out in the same manner as in Example 1 except for using 1.05 g (0.004 mol) of (CH$_3$CH$_2$CH$_2$CH$_2$)$_4$NF in place of KF, the reaction mixture under stirring turned to a white gel-like matter in 3 minutes after the dropwise addition of the aqueous (CH$_3$CH$_2$CH$_2$CH$_2$)$_4$NF solution was over. The gel-like matter was treated in the same manner as in Example 1, to give 23.0 g of a silica powder having a bulk specific gravity of 0.32 g/cm$^3$ and a specific surface area of 778 m$^2$/g.

Example 6

When a reaction was carried out in the same manner as in Example 1 except for using KF in an amount of 0.46 g (0.04 mol), the reaction mixture under stirring turned to a white gel-like matter in 3 minutes after the dropwise addition of the aqueous KF solution was over. The gel-like matter was treated in the same manner as in Example 1, to give 24.0 g of a silica powder having a bulk specific gravity of 0.28 g/cm$^3$ and a specific surface area of 802 m$^2$/g.

Example 7

When a reaction was carried out in the same manner as in Example 1 except for omitting the solvent ethanol, the reaction mixture under stirring turned to a white gel-like matter in 1 minute after the dropwise addition of the aqueous solution was over. The gel-like matter was treated in the same manner as in Example 1, to give 24.0 g of a silica powder having a bulk specific gravity of 0.27 g/cm$^3$ and a specific surface area of 837 m$^2$/g.

Example 8

A 500-ml reaction vessel equipped with a stirrer, thermometer and cooler was charged with 0.2 g (0.004 mol) of KF, 30 g (1.68 mol) of water and 68 g (1.5 mol) of ethanol, followed by mixing by stirring.

To the mixture in the vessel, 61 g (0.4 mol) of tetramethoxysilane was added dropwise. After the addition was over, the resulting mixture was stirred at room temperature for 4 minutes, through which the reaction mixture turned from a colorless transparent liquid to a white gel-like matter. The gel-like matter was treated in the same manner as in Example 1, to give 23.6 g of a silica powder. The silica powder obtained had a bulk specific gravity of 0.36 g/cm$^3$ and a specific surface area of 727 m$^2$/g.

Example 9

When a reaction was carried out in the same manner as in Example 1 except for using water in an amount of 120 g (6.67 mol), the reaction mixture under stirring turned to a white gel-like matter in 15 minutes after the dropwise addition of the aqueous KF solution was over. The gel-like matter was treated in the same manner as in Example 1, to give 23.0 g of a silica powder having a bulk specific gravity of 0.38 g/cm$^3$ and a specific surface area of 711 m$^2$/g.

Example 10

When a reaction was carried out in the same manner as in Example 1 except for using 84 g (0.4 mol) of tetraethoxysilane in place of tetramethoxysilane, the reaction mixture under stirring turned to a white gel-like matter in 9 minutes after the dropwise addition of the aqueous solution was over. The gel-like matter was treated in the same manner as in Example 1, to give 23.1 g of a silica powder having a bulk specific gravity of 0.31 g/cm$^3$ and a specific surface area of 785 m$^2$/g.

Example 11

When a reaction was carried out in the same manner as in Example 1 except for using 55 g (0.4 mol) of methyltrimethoxysilane in place of tetramethoxysilane and using water in an amount of 23 g (1.28 mol), the reaction mixture under stirring turned to a white gel-like matter in 7 minutes after the dropwise addition of the aqueous solution was over. Thegel-like matter was treated in the same manner as in Example 1, to give 26.2 g of a methylsilsesquioxane powder having a bulk specific gravity of 0.38 g/cm$^3$ and a specific surface area of 707 m$^2$/g.

Example 12

When a reaction was carried out in the same manner as in Example 1 except for using 79.2 g (0.4 mol) of phenyltrimethoxysilane in place of tetramethoxysilane and using water in an amount of 23 g (1.28 mol), the reaction mixture under stirring turned to a white gel-like matter in 20 minutes after the dropwise addition of the aqueous solution was over. The gel-like matter was treated in the same manner as in Example 1, to give 51.8 g of a phenylsilsesquioxane powder having a bulk specific gravity of 0.40 g/cm$^3$ and a specific surface area of 699 m$^2$/g.

Comparative Example 1

A 500-ml reaction vessel equipped with a stirrer, thermometer and cooler was charged with 61 g (0.4 mol) of tetramethoxysilane and 68 g (1.5 mol) of ethanol, followed by mixing by stirring.

To the mixture in the vessel, 30 g of a 5% aqueous hydrochloric acid solution was added dropwise. After the addition was over, the resulting mixture was stirred at room temperature for 40 days, through which the reaction mixture turned from a colorless transparent liquid to a white gel-like matter. The gel-like matter was treated in the same manner as in Example 1, to give 22.1 g of a silica powder.

The silica powder obtained had a bulk specific gravity of 1.10 g/cm$^3$ and a specific surface area of 157 m$^2$/g.

Comparative Example 2

When a reaction was carried out in the same manner as in Comparative Example 1 except for using 45 g of a 33% aqueous hydrochloric acid solution instead of the 5% hydrochloric acid solution, the reaction mixture under stirring turned to a white gel-like matter in 10 hours after the dropwise addition of the aqueous acid solution was over. The gel-like matter was treated in the same manner as in Example 1, to give 23.0 g of a silica powder having a bulk specific gravity of 0.96 g/cm$^3$ and a specific surface area of 180 m$^2$/g.

Example 13

A 500-ml reaction vessel equipped with a stirrer, thermometer and cooler was charged with 61 g (0.4 mol) of tetramethoxysilane, 68 g (1.5 mol) of ethanol and 8 g (40 mmol) of fluorotriethoxysilane, followed by mixing by stirring.

To the mixture in the vessel, 30 g (1.68 mol) of water was added dropwise. After the addition was over, the resulting mixture was stirred at room temperature for 6 minutes, through which the reaction mixture turned from a colorless transparent liquid to a white gel-like matter. The gel-like matter was filtered off through a Buchner funnel, and washed with distilled water and subsequently with acetone. After it was confirmed with a pH test paper that the washings came to have a pH of 7, the washed product was treated at 120° C. and 15 mmHg for 2 hours in a vacuum dryer for removing the solvents therefrom, to give 26.0 g of a silica powder having a bulk specific gravity of 0.30 g/cm$^3$ and a specific surface area of 785 m$^2$/g.

Example 14

When a reaction was carried out in the same manner as in Example 13 except for using fluorotriethoxysilane in an amount of 0.8 g (0.04 mol), the reaction mixture under stirring turned to a white gel-like matter in 32 minutes after the dropwise addition of water was over. The gel-like matter was treated in the same manner as in Example 13, to give 25.9 g of a silica powder having a bulk specific gravity of 0.38 g/cm$^3$ and a specific surface area of 723 m$^2$/g.

Example 15

When a reaction was carried out in the same manner as in Example 13 except for using 84 g (0.04 mmol) of tetraethoxysilane in place of tetramethoxysilane, the reaction mixture under stirring turned to a white gel-like matter in 20 minutes after the dropwise addition of water was over. The gel-like matter was treated in the same manner as in

Example 16

When a reaction was carried out in the same manner as in Example 13 except for using 55 g (0.4 mol) of methyltrimethoxysilane in place of tetramethoxysilane and using water in an amount of 23 g (1.28 mol), the reaction mixture under stirring turned to a white gel-like matter in 15 minutes after the dropwise addition of water was over. The gel-like matter was treated in the same manner as in Example 13, to give 29.0 g of a powder of methylsilsesquioxane having a bulk specific gravity of 0.39 g/cm³ and a specific surface area of 710 m²/g.

Example 17

When a reaction was carried out in the same manner as in Example 13 except for using 79.2 g (0.4 mol) of phenyltrimethoxysilane in place of tetramethoxysilane and using water in an amount of 23 g (1.28 mol), the reaction mixture under stirring turned to a white gel-like matter in 1 hour after the dropwise addition of water was over. The gel-like matter was treated in the same manner as in Example 13, to give 52.0 g of a powder of phenylsilsesquioxane having a bulk specific gravity of 0.41 g/cm³ and a specific surface area of 695 m²/g.

Example 18

When a reaction was carried out in the same manner as in Example 13 except for using 5 g (0.04 mol) of fluorotriethylsilane in place of fluorotriethoxysilane, the reaction mixture under stirring turned to a white gel-like matter in 40 minutes after the dropwise addition of water was over. The gel-like matter was treated in the same manner as in Example 13, to give 23.0 g of a silica powder having a bulk specific gravity of 0.42 g/cm³ and a specific surface area of 681 m²/g.

Example 19

When a reaction was carried out in the same manner as in Example 13 except for omitting the solvent ethanol, the reaction mixture under stirring turned to a white gel-like matter in 1 minute after the dropwise addition of water was over. The gel-like matter was treated in the same manner as in Example 13, to give 26.1 g of a silica powder having a bulk specific gravity of 0.28 g/cm³ and a specific surface area of 820 m²/g.

Example 20

A 500-ml reaction vessel equipped with a stirrer, thermometer and cooler was charged with 30 g (1.68 mol) of water. To the water in the vessel was added dropwise a solution prepared by mixing 61 g (0.4 mol) of tetramethoxysilane with 8 g (0.04 mol) of fluorotriethoxysilane. After the addition was over, the resulting mixture was stirred at room temperature for 1 minute, through which the reaction mixture turned from a colorless transparent liquid to a white gel-like matter. The gel-like matter was treated in the same manner as in Example 13, to give 26.0 g of a silica powder.

The silica powder obtained had a bulk specific gravity of 0.29 g/cm³ and a specific surface area of 815 m²/g.

Example 21

A 500-ml reaction vessel equipped with a stirrer, thermometer and cooler was charged with 61 g (0.4 mol) of tetramethoxysilane, to which was added dropwise a solution of 1.2 g (0.007 mol) of ammonium hexafluorosilicate in 30 g (1.68 mol) of water.

After the addition was over, the resulting mixture was stirred at room temperature for 1 minute, through which the reaction mixture turned from a colorless transparent liquid to a white gel-like matter. The gel-like matter was treated in the same manner as in Example 13, to give 23.6 g of a silica powder.

The silica powder obtained had a bulk specific gravity of 0.26 g/cm³ and a specific surface area of 830 m²/g.

Example 22

The reaction mixture under stirring turned to a white gel-like matter in 10 minutes after the dropwise addition of water was over. The gel-like matter was treated in the same manner as in Example 13, to give 25.0 g of a silica powder having a bulk specific gravity of 0.35 g/cm³ and a specific surface area of 776 m²/g.

Comparative Example 3

When a reaction was carried out in the same manner as in Example 13 except for using chlorotriethoxysilane instead of fluorotriethoxysilane, the reaction mixture under stirring turned to a white gel-like matter in 7 days after the dropwise addition of water was over. The gel-like matter was treated in the same manner as in Example 13, to give 24.9 g of a silica powder having a bulk specific gravity of 0.95 g/cm³ and a specific surface area of 193 m²/g.

What is claimed is:

1. A process for preparing a powder of a silicon compound, comprising subjecting an alkoxysilane having the formula:

$$(OR^2)_x Si(R^2)_{4-x}$$

wherein X is an integer of 1 to 4, $R^1$ and $R^2$ are each independently an unsubstituted monovalent hydrocarbon group or a monovalent hydrocarbon group in which a part or all of the hydrogen atoms have been substituted with halogen, and said alkoxysilane comprises a monoalkoxysilane, a dialkoxysilane or both in a total amount of not more than 30% by weight of said alkoxysilane, to a hydrolysis-polycondensation reaction in the presence of at least one compound selected from the group consisting of fluoride salts and fluorine-containing silicon compounds having at least one Si—F bond.

2. The process of claim 1, further comprising the step of recovering said powder from the reaction.

3. The process of claim 2, wherein said alkoxysilane comprises a tetraalkoxysilane, a trialkoxysilane or a mixture thereof.

4. The process of claim 3, wherein said alkoxysilane comprises a compound selected from the group consisting of $Si(OCH_3)_4$, $Si(OC_2H_5)_4$, $CH_3Si(OCH_3)_3$ and $CH_3Si(OC_2H_5)_3$).

5. The process of claim 1, wherein said compound selected from the group consisting of fluoride salts and fluorine-containing silicon compounds is selected from the group consisting of LiF, NaF, KF, RbF, CsF, BeF$_2$, MgF$_2$, CaF$_2$, SrF$_2$, BaF$_2$, BF$_3$, AlF$_3$, GaF$_3$, InF$_3$, TlF$_3$, CuF$_2$, ZnF$_2$, SnF$_2$, PdF$_2$, SbF$_3$, CrF$_3$, YF$_3$, LaF$_3$, CeF$_3$, PrF$_3$, NdF$_3$, SmF$_3$, EuF$_3$, GdF$_3$, TbF$_3$, DyF$_3$, HoF$_3$, ErF$_3$, quaternary ammonium fluorides and fluorine-containing silicon compounds having at least one SiF bond.

6. The process of claim 1, wherein said compound selected from the group consisting of fluoride salts and fluorine-containing silicon compounds is at least one fluoride salt selected from the group consisting of NaF, KF and (CH$_3$CH$_2$CH$_2$CH$_2$)$_4$N.F.

7. The process of claim 1, wherein said compound selected from the group consisting of fluoride salts and fluorine-containing silicon compounds is at least one fluorine-containing silicon compound selected from the group consisting of silane compounds having the following formulas:

$$F_pSi(OR)_{r-p}$$

and
wherein R is an alkyl group having not more than 4 carbon atoms, and p is an integer of 1 to 3.

8. The process of claim 1, wherein said compound selected from the group consisting of fluoride salts and fluorine-containing silicon compounds is at least one fluorine-containing silicon compound selected from the group consisting of SiF$_4$, H$_2$SiF$_6$, Na$_2$SiF$_6$ and (NH$_4$)$_2$SiF$_6$.

9. The process of claim 1, wherein said compound selected from the group consisting of fluoride salts and fluorine-containing silicon compounds is at least one fluorine-containing silicon compound elected from the group consisting of FSi(OCH$_3$)$_3$, FSi(OC$_2$H$_5$) and (NH$_4$)$_2$SiF$_6$.

10. The process of claim 1, wherein the ratio of the number of moles of the silicon atoms provided by the alkoxysilane to the number of moles of the fluorine atoms provided by said compound selected from the group consisting of fluoride salts and fluorine-containing silicon compounds is in the range from 1.0:0.001 to 1.0:2.0.

* * * * *